Patented Feb. 16, 1937

2,070,658

UNITED STATES PATENT OFFICE 2,070,658

MANUFACTURE OF FERTILIZER

Herman L. Hartenstein, Chicago, Ill.

No Drawing. Application August 18, 1934,
Serial No. 740,457

12 Claims. (Cl. 71—8)

This invention relates to the utilization of muck and peat for the production of fertilizer and/or a filler, by means of thermal and moisture treatment, with or without the addition of fresh, unfermented or live plant.

Untreated peat having undergone partial decomposition does not readily change its composition when added to the soil, while fresh plant material under optimum conditions of moisture and warmth, owing to its greater proportions of easily decomposable substances, is promptly changed, hence a practical process or treatment by which peat will act as common green manure, and also furnish increased nitrogen and inorganic plant food substances at a cost that is economical, is of decided importance and merit as the enormous quantities already existing in nature are rendered useful as efficient soil and plant food matter.

The term "peat" will be used herein to also include such other forms commonly known as muck.

The process is of a general nature and is applicable to various qualities of peat with or without the additions of unfermented plant substances. It is also well known that peat contains practically no potash.

It has been found that immature plants of the grain producing group contain nitrogen, and other useful elements valuable in the production of fertilizer, as they especially are rich in potash, therefore, in certain sections of the country it is feasible and practical that a portion of the peat utilized in the present thermal-moisture composition and process, be replaced with any desirable or varying proportions of the cut, ground or divided immature corn plants, so that the potash and other useful inorganic plant food constituents in the products resultant are increased. Immature sunflower, certain grasses, weeds and/or various immature plants may be utilized in the process. The addition of sweet clover is useful, owing to its nitrogen content, and its rapid decomposition under the ideal condition existing in this process, which condition excels those prevailing in greenhouses as to optimum moisture and warmth. By this method of treating and utilizing peat in the presence of fresh, live or unfermented immature plants the progress of the process is expedited, the heat disengaged is beneficial, while the gases evolved tend to raise the mixtures under treatment, rendering same porous and spongy. The use of immature corn plants of the grain producing group, however, constitutes the subject matter of my co-pending application, Serial Number 697,469, filed November 10, 1933.

It is, however, one of the objects of the present invention to conserve and utilize as much of these substances as possible, particularly at the period of growth and when the plants contain their maximum percentages of nitrogen and potash.

The terms "fresh", "live", and "unfermented" denote that such plant materials have received no treatment, natural or artificial which would cause changes in chemical composition. In this application the term "plant material" will be used to apply to all forms of fresh, live or unfermented plants, and statements made herein are to be understood as applying to all, unless otherwise stated.

Peat in its native state, as well as when air dried contains enormous quantities of weed seeds which heretofore caused its use to be objectionable for fertilizer or filler.

It is one of the objects of the present invention to destroy all weed seeds contained in the peat.

It is well known in the fertilizer industry that vast quantities of worthless coal ashes, sand and dirt have heretofore been used as a filler, which adds great expense for bags, labor, freight and the handling of useless material. It is another object of this invention to eliminate the practice of using such inert materials for such purpose.

The resultant products of this invention, the paramount factors of which are the continuous or uninterrupted thermal treatment of peat as well as other plant food substances in conjunction with optimum moisture conditions, constitutes a filler and/or fertilizer, which supplies a portion of the nitrogen required in the high analysis fertilizer, as well as very large quantities of organic matter, and such percentages of mineral compounds as may be desired; its incorporation in mixtures will prevent all setting or hardening, resulting in a high grade fertilizer and filler and in which all weed seeds are destroyed.

The product resulting from my process is employed to replace the heretofore useless fillers, resulting in a superior organic and efficient nitrogen, as well as mineral or inorganic constituents if desired.

The present invention further contemplates putting in a more available or efficient form the nitrogen content and other constituents of peat when placed in the soil, which has heretofore been said to be unavailable. In the event efficient inorganic plant food compounds are desired in the ultimate products of processing, there may be incorporated with the peat, ammonia or nitrogen carriers, and one or more mineral compounds, as for instance, gypsum, sulphur, or sulphur containing substances, marl and phosphate rock, which raw material should preferably be pulverized to a degree of superfineness so that it will pass, if desired, a 300 mesh test sieve, resulting in a large percentage passing through a 350 or 400 mesh test sieve, such percentages and degrees of fineness depending upon the characteristics of the material, and whether it reduces to a powder easily or not, however, superfine pulverization of the crude minerals is an important factor in the efficiency and progress of processing as well as the quality of the products.

The use of expensive acidulating apparatus and machinery, processes and chemicals are obviated, therefore, in a direct, efficient and economical manner without heavy financial investment for apparatus and plant equipment, the native peat with or without added minerals may be converted into fertilizer or filler.

Acidity in the resultant product, if any, may be avoided by the use of a slight excess of phosphate rock in the mixture, or with the addition of a small percentage of marl or limestone, the former being preferred because it exists under many peat deposits and is obtainable at a minimum expense.

Acidulated, processed, superphosphate or treble-superphosphate as well as any compound containing phosphoric acid in a more available form of any grade or degree of fineness, may be incorporated therewith when such additions are desired. The addition of the plant material in all mixtures has been found beneficial.

If modification of nitrogen content is desired, one or more liquid ammonia or nitrogen carriers, such as urea-ammonia solution, anhydrous, and aqua ammonia, which are the most abundant and cheapest forms of nitrogen and are available in tank cars, or solid nitrogen carriers such as ammonium nitrate, leuna saltpeter, ammonium chloride, ammonium sulphate, or urea in any proportion desired, may be incorporated with the peat, if acidulous material is desired, either before or after the moisture-thermal treatment, as well as after such treatment and final drying and pulverizing.

Likewise, calcium nitrate, cyanamide, or sodium nitrate may be added if an alkaline material is desired.

As the retention by soil of all these materials are rated either low or medium, losses in the soil will be prevented when such nitrogen carriers are thoroughly incorporated or mixed with the organic vegetable material, while the latter will also be benefited.

The phosphorous content may also be modified by the addition of any substance containing phosphorous or phosphorous acid in available or efficient form, as for instance acidulated, processed or superphosphates of any grade.

In carrying the present invention into operation preferably a power bucket, scraper or shovel may be used to remove the peat from the bog and place same in a large pile; in the event, however, that there is too much of an excess of water present it should be allowed to drain, evaporate or weather, for any desired time. The object is to cure the peat and avoid the handling of needless water.

In the thermal treatment of finely divided peat, no shredding is required, however, should the peat be coarse or lumpy it is crushed or shredded automatically as it is being conveyed into a direct heat rotary heater provided with dust chambers, and is continuously passed through the heater. The material in all cases is sufficiently fine to incorporate thoroughly with minerals. In order to prevent any loss of nitrogen the wet peat is fed in at the fire end and is passed through at such a speed as to insure its containing a moisture content of approximately from 30 to 70 per cent, as it is deposited in a bin.

The incorporation of minerals and peat may be effected by the use of an ordinary mixing machine, or any preferred manner, either before or after preliminary heating. However, in the interest of economy the proper mixing is best performed automatically and continuously by installing mixing blades in screw conveyors located at one or both ends of the dryer, over which hoppers are mounted for containing and feeding the minerals mixed or separately, into and incorporating same with the peat as the materials are being continuously introduced into the dryer or heater, or as they emerge therefrom.

The peat with or without the addition of very finely pulverized minerals is then heated preferably by passing same through a direct heat rotary heater, for the purpose of preheating; and is continuously discharged and deposited while hot, into a container or building, in which condition it may be allowed to age, during which period peat alone or incorporated with the other materials specified will continue in a like heated condition without further application of heat, even with outside winter temperature—while the moisture has decreased.

The containers or receptacles are preferably from 15 to 20 feet or more in depth, and of ample dimensions to contain a large tonnage: when filled with heated materials for processing. Large containers and large masses or contents are very desirable for the retension of heat.

The container or receptacle should be provided with flues or ventilators for controlling excessive temperatures, and with means or pipes for admitting liquid ammonia or nitrogen solutions, air, and/or well oxidized gaseous combustion products of furnaces and internal combustion engines, in order to furnish aeration and carbon dioxide which seemingly serves to expedite the process.

Sulphur in the elemental form should be added at the discharge end of the heater.

Liquid nitrogen carriers under pressure, in the proportions of approximately the equivalent of ten pounds of nitrogen to one ton of the mixture may be introduced, injected and incorporated with the materials in the receptacle through pipes at the beginning, and at intervals of several days or a week during the processing, it being understood that the higher ratios of nitrogen desired in finished products should have more injections of the carriers.

Nitrogen may be conserved and the process expedited by the introduction of the reburned or oxidized gases coming from internal combustion engines into the mixed materials under treatment. Such waste gases or products contain nitrogen, oxygen, carbon monoxide (CO) and carbon dioxide ($CO_2$) and in the further burning or oxidation in the presence of additional air in a suitable burner the percentage of carbon dioxide as compared with the carbon monoxide is greatly increased, and consists largely of nitrogen and carbon dioxide, is very well adapted to my purposes and at a minimum expense.

The temperature of the material during heat treatment should preferably be approximately between 70° F. and 100° F. and up to 160° F. or higher, when the minerals predominate.

The material may remain under treatment in the bins from four to twelve weeks, and if it remains in the bin for a longer period of time no harmful results will ensue.

The self-continuous thermal and moisture treatment is effective in making the nitrogen as well as mineral content much more available and efficient, the moisture content is reduced, and there is no loss of heat to complete the drying.

It is then dried to remove excessive moisture, if any, and after grinding is ready for use as filler or fertilizer.

By means of this invention and under conditions of optimum moisture and temperature prevailing in the containers, the materials have been found to change in three weeks to such an extent, that when applied in the soil a crop planted made a good increased growth.

When the treatment in bins was continued for a longer period and the product used in the field for manure or fertilizer the growth of crops and yields greatly increased.

I have found that the products resulting from the thermal and moisture treatment of peat, either with or without the addition of minerals, materials and compounds outlined herein, are very efficient as plant foods and as additions to the soil. They possess very definite advantages over ordinary fertilizers in general use, while as filler or conditioner they improve the quality of the soil to which they are applied in the following respects. In the first place decomposition of the organic matter produces carbon dioxide. This acts upon the insoluble mineral constituents of the soil, rendering them to some extent soluble, in many cases more available to the plant. Secondly they increase the capacity of the soil to retain moisture, and therefore nitrogen—reduces leaching and percolation losses of costly fertilizer ingredients incorporated therewith. And further, they add to the fertility of clay soils by opening them up to the air and eliminating stickiness or heaviness, and supply all the plant food requirements possible to be found in a combination of the better barnyard manures and commercial fertilizers.

Owing to the variation in the qualities of peat, it is difficult to state exact quantities of ingredients, and it will be understood this should be under chemical control, however, some of the various examples of the products produced in accordance with the principles of this invention, and the quantities and proportions of the material employed in conjunction with the thermal-moisture processing is about as follows.

It is understood the equivalent of nitrogen is in the form of ammonia or nitrogen carriers— either liquid or solid.

Peat on a 50 per cent moisture basis, all minerals finely pulverized.

1st. Peat 4000 lbs. Nitrogen 100 lbs.

2nd. Peat 4000 lbs. Phosphate rock 150 lbs. Gypsum 150 lbs.

3rd. Peat 4000 lbs. Phosphate rock 150 lbs. Nitrogen 20 lbs.

4th. Peat 4000 lbs. Sulphur 100 lbs. Phosphate rock 400 lbs.

5th. Peat 4000 lbs. Phosphate rock 500 lbs. Gypsum 100 lbs. Sulphur 80 lbs.

6th. Peat 4000 lbs. Phosphate rock 500 lbs. Sulphur 100 lbs. Nitrogen 20 lbs.

7th. Peat 2000 lbs. Plant material 2000 lbs. Nitrogen 80 lbs.

8th. Peat 3500 lbs. Plant material 500 lbs. Nitrogen 90 lbs.

9th. Peat 2000 lbs. Plant material 2000 lbs. Phosphate rock 350 lbs. Nitrogen 30 lbs. Sulphur 80 lbs.

10th. Peat 2000 lbs. Plant material 2000 lbs. Phosphate rock 350 lbs. Sulphur 50 lbs. Gypsum 100 lbs. Nitrogen 30 lbs.

In following the steps of this invention it will be understood that for the purpose of increased potassium or potash contents or for other purposes, the proportions of peat in any or all mixtures may be reduced, and a suitable quantity of the plant material is used in the mixtures in lieu thereof.

Hundreds of tons of products produced in accordance with this invention have been used for growing crops and as ingredients of commercial fertilizers as well as for fillers, and were found to add substantial percentages of efficient nitrogen to the finished fertilizer and filler. The State of Michigan analysis indicated available nitrogen much in excess of nitrogen contents of the other constituents incorporated in the mixtures.

The minerals as for instance, gypsum and/or phosphate rock singly or mixed together, in any desired proportions, and either with or without potassium bearing material are added before or after heating the peat and in any desired proportions. Sulphur in the elemental should be added at the discharge end of the heater.

By the use of the term "self-continued" as employed in the claims is meant, that the mass is heated by applied heat and subsequently, and without the applied heat, the mass is maintained hot by the heat which has been absorbed during the preliminary heating in other words "self-contained" heat.

It is thought that the operation of the process will be clearly understood, but briefly stated the invention consists in a process for the thermal and moisture treatment of peat with or without the addition of live plant material, minerals, nitrogen carriers, finely pulverized phosphorous calcium and potassium bearing substances, sulphur, gypsum or sulphur carrying substances in any preferred proportions.

While some examples of this invention, based upon much practical experience and work, have been given, it is understood that various changes and modifications may be made therein, and also in the steps of processing, nitrogen carriers alone may be added—the unheated live plant materials may be placed in strata or layers under or/and between the hot materials, in which event the temperature of the heated materials when introduced may be somewhat higher: heating the cold materials in the containers by means of steam and piping is possible but is not efficient, uniform and economical; in lieu of raw phosphate rock, acidulated, processed or super-phosphate may be used, and other changes and substitutes may be used, within the scope of the claims, without departing from the spirit of this invention.

What I claim as new is:—

1. The thermal moisture method of manufacturing fertilizer ingredients which comprises charging continuously native wet peat into a rotary heating furnace to preheat the mass, mixing therewith immature sunflower plant material, continuously discharging and depositing the preheated hot moist mass into bins, aging the mass under its contained and self-maintained heat at atmospheric pressure for a period of not less than four weeks, and at the beginning of as well as during the aging period, at intervals of several days, injecting thereinto liquid ammonia, and finally drying and grinding the product.

2. The thermal moisture method of manufacturing fertilizer ingredients which comprises charging continuously native wet peat into a rotary heating furnace to preheat the mass, mixing therewith immature corn plant material, for the purpose of supplying vegetable potash to the peat, adding gypsum, continuously discharging and depositing the preheated hot moist mass into bins, aging the mass under its contained and self-maintained heat at atmospheric pressure for a period of not less than four weeks, and at the beginning of as well as during the aging period, at intervals of several days, injecting thereinto liquid ammonia, and finally drying and grinding the product.

3. The thermal moisture method of manufacturing fertilizer ingredients which comprises charging continuously native wet peat into a rotary heating furnace to preheat the mass, mixing therewith immature corn plant material for the purpose of increasing the potash content, adding gypsum and phosphate rock, continuously discharging and depositing the preheated hot moist mass into bins, aging the mass under its contained and self-maintained heat at atmospheric pressure for a period of not less than four weeks, and at the beginning of as well as during the aging period, at intervals of several days, injecting thereinto liquid ammonia, and finally drying and grinding the product.

4. The thermal moisture method of manufacturing fertilizer ingredients which comprises charging continuously native wet peat into a rotary heating furnace to preheat the mass, mixing therewith immature corn plant material for the purpose of adding essential potash to the peat, adding processed phosphate bearing material, continuously discharging and depositing the preheated hot moist mass into bins, aging the mass under its contained and self-maintained heat at atmospheric pressure for a period of not less than four weeks, and at the beginning of as well as during the aging period, at intervals of several days, injecting thereinto liquid ammonia, and finally drying and grinding the product.

5. The continuous thermal moisture process of manufacturing fertilizer ingredients which comprises delivering native wet peat into a heater for preheating the mass, mixing therewith immature corn plant material for the purpose of supplying vegetable potash to the peat, and continuously depositing the hot mass containing a moisture value content of approximately from thirty to seventy per cent as it is deposited from the heater into a bin, aging under its self-contained heat at atmospheric pressure for a period of not less than four weeks the mass deposited from the heater into the bin, which aging heat and moisture is effective in rendering the nitrogen content readily available and efficient, the moisture content being reduced, then finally drying the mass and grinding the resultant product.

6. The thermal moisture method of manufacturing fertilizer ingredients which comprises charging continuously native wet peat into a rotary heating furnace to preheat the mass, mixing therewith immature corn plant material for the purpose of adding essential potash to the mass, continuously discharging and depositing into bins, the preheated mass, containing a moisture value content of approximately from thirty to seventy per cent as it is deposited into the bins, aging the mass under its contained and self-maintained heat at atmospheric pressure, for a period of not less than four weeks, and at the beginning of as well as during the aging period, at intervals of several days, injecting thereinto liquid ammonia and solutions of nitrogen compounds having fertilizing value, which aging, heat and moisture are effective in rendering the nitrogen content readily available and efficient, the moisture content being reduced, and finally drying and grinding the product.

7. The thermal moisture method of manufacturing fertilizer ingredients which comprises charging continuously native peat into a rotary heating furnace to preheat the mass, mixing therewith immature corn plant material for the purpose of adding essential vegetable potash to the peat, continuously discharging and depositing the preheated hot mass containing a moisture value content of approximately from thirty to seventy per cent, into bins, aging the mass under its continued and self-maintained heat at atmospheric pressure for a period of not less than four weeks, and at the beginning of as well as during the aging period, at intervals of several days, injecting thereinto solutions of nitrogen compounds having fertilizing value essential and suitable for plant and soil nutrients, and finally drying and grinding the product.

8. The thermal moisture method of manufacturing fertilizer ingredients which comprises mixing with native wet peat, finely ground gypsum and phosphate rock and charging the mass continuously into a rotary heating furnace to preheat the mass, mixing therewith immature sunflower material for the purpose of supplying vegetable potash to the peat, continuously discharging and depositing the preheated hot mass containing a moisture value content of approximately from thirty to seventy per cent into bins, aging the mass under its continued and self-maintained heat at atmospheric pressure for a period of not less than four weeks, and at the beginning of as well as during the aging period, at intervals of several days, injecting thereinto solutions of nitrogen compounds having fertilizing value, carbon dioxide and nitrogen gases, which aging, gases, heat and moisture, are effective in rendering the nitrogen as well as the mineral content readily available and efficient, the moisture content being reduced, and finally drying and grinding the product.

9. The thermal moisture method of manufacturing fertilizer ingredients which comprises charging continuously native wet peat and gypsum into a rotary heating furnace to preheat the mass, mixing therewith immature sunflower plant material for the purpose of supplying vegetable potash to increase the potash content, continuously discharging and depositing the preheated hot mass containing a moisture value content of approximately from thirty to seventy per cent, into bins, aging the mass under its continued and self-maintained heat at atmospheric pressure for a period of not less than four weeks, and at the beginning of as well as during the aging period, at intervals of several days, injecting thereinto liquid ammonia, which aging, heat and moisture are effective in rendering the nitrogen and mineral content readily available and efficient, and finally drying and grinding the product.

10. The thermal moisture method of manufacturing fertilizer ingredients which comprises charging continuously native wet peat into a rotary heating furnace to preheat the mass, mixing therewith immature sunflower plant material for the purpose of adding essential potash to the peat, adding processed phosphate bearing material, continuously discharging and depositing the preheated hot moist mass into bins, aging the mass under its contained and self-maintained heat at atmospheric pressure for a period of not less than four weeks, and at the beginning of as well as during the aging period, at intervals of several days, injecting thereinto solutions of nitrogen compounds having fertilizing value, and finally drying and grinding the product.

11. The thermal moisture method of manufacturing fertilizer ingredients which comprises charging continuously native wet peat, gypsum and phosphate rock into a rotary heating furnace to preheat the mass, continuously discharging and depositing the preheated mass containing a moisture content of approximately from thirty to seventy per cent into bins, aging the mass under its continued and self-contained heat at atmospheric pressure for a period of not less than four weeks, and at the beginning of as well as during the aging period, at intervals of several days, injecting thereinto solutions of nitrogen compounds having fertilizing value, nitrogen and carbon dioxide gases, which heat, moisture and aging are effective in rendering the nitrogen and phosphorous content readily available and effective, the moisture content being reduced, and finally drying and grinding the product.

12. The thermal moisture method of manufacturing fertilizer ingredients which comprises charging continuously native wet peat, gypsum and phosphate rock into a rotary heating furnace to preheat the mass, mixing therewith immature corn plant material to increase the vegetable potash content, continuously discharging and depositing the preheated hot mass, containing a moisture content of approximately from thirty to seventy per cent into bins, aging the mass under its contained and self-maintained heat at atmospheric pressure for a period of not less than four weeks, and at the beginning of as well as during the aging period, at intervals of several days, injecting thereinto liquid ammonia, nitrogen and carbon dioxide gases, to render the nitrogen as well as the mineral content readily available and efficient, the moisture content being reduced, and finally drying and grinding the product.

HERMAN L. HARTENSTEIN.